United States Patent
Tani

(10) Patent No.: US 9,408,117 B2
(45) Date of Patent: Aug. 2, 2016

(54) BASE STATION DEVICE, HANDOVER CONTROLLING METHOD, AND RADIO COMMUNICATION SYSTEM

(71) Applicant: FUJITSU LIMITED, Kawasaki-shi, Kanagawa (JP)

(72) Inventor: Mitsuhiro Tani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 14/259,352

(22) Filed: Apr. 23, 2014

(65) Prior Publication Data

US 2014/0348128 A1 Nov. 27, 2014

(30) Foreign Application Priority Data

May 24, 2013 (JP) ................. 2013-110408

(51) Int. Cl.
- H04W 36/00 (2009.01)
- H04B 7/155 (2006.01)
- H04W 28/08 (2009.01)
- H04W 36/04 (2009.01)
- H04W 84/04 (2009.01)
- H04W 92/20 (2009.01)

(52) U.S. Cl.
CPC .......... H04W 36/0055 (2013.01); H04B 7/155 (2013.01); H04W 28/08 (2013.01); H04W 36/04 (2013.01); H04W 84/047 (2013.01); H04W 92/20 (2013.01)

(58) Field of Classification Search
None
See application file for complete search history.

(56) References Cited

U.S. PATENT DOCUMENTS

| | | | | |
|---|---|---|---|---|
| 2010/0322193 A1* | 12/2010 | Hu | .......................... | H04B 7/155 370/331 |
| 2010/0322197 A1* | 12/2010 | Adjakple | ............... | H04B 7/155 370/332 |
| 2012/0100855 A1* | 4/2012 | Zhang | .................... | H04B 7/155 455/436 |
| 2012/0106435 A1* | 5/2012 | Hapsari | ............. | H04W 36/0016 370/315 |
| 2012/0243461 A1* | 9/2012 | Bucknell | ............... | H04W 36/02 370/315 |
| 2012/0252355 A1* | 10/2012 | Huang | ............... | H04W 36/0033 455/7 |
| 2012/0276910 A1* | 11/2012 | Zhang | ............... | H04W 36/0005 455/439 |
| 2013/0324130 A1* | 12/2013 | Maruta | ................. | H04W 36/00 455/436 |
| 2015/0117403 A1* | 4/2015 | Kubota | .................... | H04W 8/02 370/331 |
| 2015/0208291 A1* | 7/2015 | Lee | .................... | H04W 36/0011 370/331 |

FOREIGN PATENT DOCUMENTS

| | | |
|---|---|---|
| JP | 2006-270180 | 10/2006 |
| JP | 2011-166274 | 8/2011 |

* cited by examiner

Primary Examiner — Gary Mui
(74) Attorney, Agent, or Firm — Fujitsu Patent Center

(57) ABSTRACT

A base station device establishes a first communication path for each mobile terminal with a control device that processes a signal related to network control or a signal related to user data. When an occurrence of handover of the mobile terminal is detected, the base station device establishes a second communication path with the base station device to be a handover destination. The base station device associates the first communication path with the second communication path. The base station device performs relay control of communication between the handed over mobile terminal and the control device based on a relationship between the first communication path and the second communication path that are associated.

6 Claims, 12 Drawing Sheets

FIG.4

| UE | MACRO BASE STATION | |
| --- | --- | --- |
| | IP ADDRESS | TE-ID |
| UE#1 | 192.168.10.1 | 11 |
| UE#2 | 192.168.10.1 | 12 |
| UE#3 | 192.168.10.1 | 13 |
| UE#4 | 192.168.10.1 | 14 |
| UE#5 | 192.168.10.1 | 15 |

FIG.5

| UE | MME/S-GW | | MACRO BASE STATION | |
| --- | --- | --- | --- | --- |
| | IP ADDRESS | TE-ID | IP ADDRESS | TE-ID |
| UE#1 | 192.168.1.1 | 1 | 192.168.10.1 | 11 |
| UE#2 | 192.168.1.1 | 2 | 192.168.10.1 | 12 |
| UE#3 | 192.168.1.1 | 3 | 192.168.10.1 | 13 |
| UE#4 | 192.168.1.1 | 4 | 192.168.10.1 | 14 |
| UE#5 | 192.168.1.1 | 5 | 192.168.10.1 | 15 |

FIG.6

| UE | MACRO BASE STATION | | SMALL BASE STATION | |
|---|---|---|---|---|
| | IP ADDRESS | TE-ID | IP ADDRESS | TE-ID |
| UE#1 | 192.168.10.1 | 111 | 192.168.20.1 | 221 |
| UE#2 | 192.168.10.1 | 112 | 192.168.20.1 | 222 |
| UE#3 | 192.168.10.1 | 113 | 192.168.20.1 | 223 |
| UE#4 | 192.168.10.1 | 114 | 192.168.20.1 | 224 |
| UE#5 | 192.168.10.1 | 115 | 192.168.20.1 | 225 |

FIG.7

| UE | TE-ID-1 | TE-ID-2 |
|---|---|---|
| UE#1 | 11 | 111 |
| UE#2 | 12 | 112 |
| UE#3 | 13 | 113 |
| UE#4 | 14 | 114 |
| UE#5 | 15 | 115 |

BASE STATION DEVICE, HANDOVER CONTROLLING METHOD, AND RADIO COMMUNICATION SYSTEM

CROSS-REFERENCE TO RELATED APPLICATION

This application is based upon and claims the benefit of priority of the prior Japanese Patent Application No. 2013-110408, filed on May 24, 2013, the entire contents of which are incorporated herein by reference.

FIELD

The embodiments discussed herein are directed to a base station device, a method of controlling handover, and a radio communication system.

BACKGROUND

In recent years, the number of high performance terminal devices each having performance equivalent to that of a personal computer is increasing, whereby an amount of data per user is also increasing. As the amount of data increases, competition for a radio resource and the like occurs among users positioned in the same base station area, whereby a reduction of a communication speed and the like occurs.

As a technique of suppressing the reduction of the communication speed and the like, downsizing of a cell in the base station has been implemented. Specifically, a communication capacity per unit area has been increased by downsizing a wireless area covered by one base station, and also by increasing the number of base stations within the same wireless area. (See, for example, Japanese Laid-open Patent Publication No. 2006-270180 and Japanese Laid-open Patent Publication No. 2011-166274).

The above-described technique, however, have a problem in that handover frequently occurs, whereby traffic of a control signal due to the handover increases, and a load on a wireless network increases.

For example, the handover occurs more frequently to a mobile terminal such as a portable terminal because an area, which has been one wireless area before, now extends over multiple cells due to downsizing of the cell of the base station.

In a case where the handover is performed between base stations due to moving of the terminal, in order to switch the base station to communicate, a control signal used in the handover is transmitted and received between a Mobility Management Entity (MME) and the base station, and between the MME and the terminal. That is, the number of handover between the base stations is increased due to the downsizing of the cell. Accompanied by this, the traffic of the control signal in the MME is increased, and as a result, a load on the wireless network is increased.

SUMMARY

According to an aspect of the embodiments, a base station device includes a first establishment unit that establishes a first communication path for each mobile terminal with a control device that processes a signal related to network control or a signal related to user data; a second establishment unit that establishes a second communication path with the base station device to be a handover destination when an occurrence of handover of the mobile terminal is detected; an association unit that associates the first communication path with the second communication path; and a transmission controller that performs relay control of communication between the handed over mobile terminal and the control device based on a relationship between the first communication path and the second communication path that are associated by the association unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a table illustrating exemplary information stored in a UE path storage unit;

FIG. 5 is a table illustrating exemplary information stored in a MME path storage unit;

FIG. 6 is a table illustrating exemplary information stored in a small path storage unit;

FIG. 7 is a table illustrating exemplary information stored in a link result storage unit;

DESCRIPTION OF EMBODIMENTS

Preferred embodiments will be explained with reference to accompanying drawings. Note that the present invention is not to be limited by the embodiments. Each of the embodiments can be combined as appropriate as long as there is no inconsistency.

[a] First Embodiment

Exemplary Overall Configuration

Figure 1:
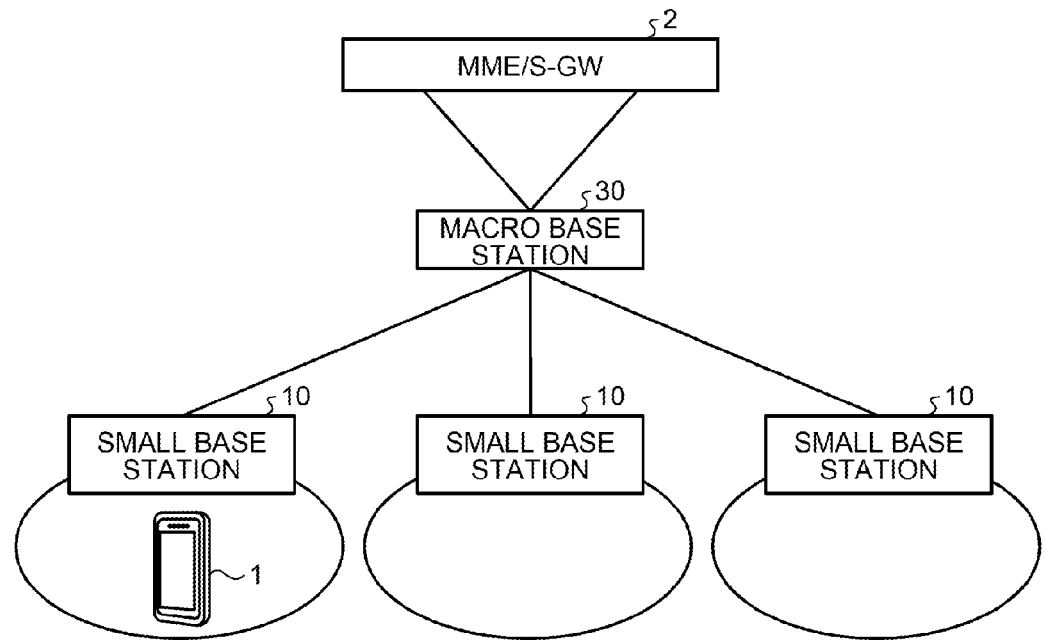
FIG. 1 is a view illustrating an exemplary overall configuration of a radio communication system according to a first embodiment.

FIG. 1 is a view illustrating an exemplary overall configuration of a radio communication system according to a first embodiment. As illustrated in FIG. 1, the system includes a portable terminal 1, a Mobility Management Entity (MME)/Serving-Gateway (S-GW) 2, a plurality of small base stations 10, and a macro base station 30.

The portable terminal 1 is an example of a mobile terminal such as a mobile phone and a smart phone in conformity with the Long Term Evolution (LTE). The portable terminal 1 performs voice communication through the base station. Furthermore, the portable terminal 1 performs data communication with the MME/S-GW 2, and performs transmission and reception of control data and transmission and reception of user data.

The MME/S-GW 2 is an access gateway that relays the control data. Furthermore, the MME/S-GW 2 is a relay device that, for example, accommodates the LTE and the Third Generation Partnership Project (3GPP) radio as well as performs routing of the user data and the like.

Each of the small base stations 10 is a base station device that provides the portable terminal 1, positioned in a cell under control thereof, with a radio resource, and that controls radio communication of the portable terminal 1. The macro base station 30, having the plurality of small base stations 10 under control thereof, is the base station device that controls handover of the portable terminal 1, relay of communication between the portable terminal 1 and the MME 2, and relay of communication between the portable terminal 1 and the S-GW 2.

Figure 2:
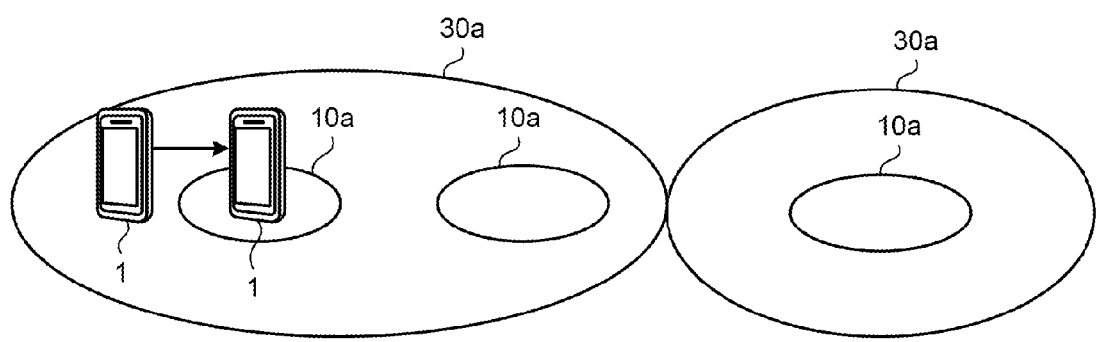
FIG. 2 is a view illustrating handover according to the first embodiment.

The handover assumed in the first embodiment is described herein. FIG. 2 is a view illustrating the handover according to the first embodiment. As illustrated in FIG. 2, the system illustrated in FIG. 1 has a cell 10a controlled by each of the small base stations 10 within a cell 30a controlled by the macro base station 30. In the first embodiment, there is described exemplary handover occurring when the portable terminal 1, performing radio communication within the cell 30a controlled by the macro base station 30, moves into the cell 10a controlled by the small base station 10.

In this case, the macro base station 30 establishes a first communication path with the MME 2 or S-GW 2 for each of the portable terminals 1. In a case where an occurrence of the handover of the portable terminal 1 is detected, the macro base station 30 establishes a second communication path with the small base station 10 to be a handover destination. Then, the macro base station 30 associates the first communication path with the second communication path. Subsequently, the macro base station 30 performs relay control of communication between the post-handover portable terminal 1 and the MME 2 or the like based on a relationship between the first communication path and the second communication path that are associated.

Therefore, a path established between the small base station 10, to be the handover destination of the portable terminal 1, and the macro base station 30 is associated with a path already established with the MME/S-GW 2 by the macro base station 30. Accordingly, the macro base station 30 can reduce an amount of data by suppressing the MME/S-GW 2 from setting a new path during the handover. Therefore, it is possible to suppress an increase in the load on the wireless network caused by the handover.

Configuration of the Macro Base Station

Figure 3:
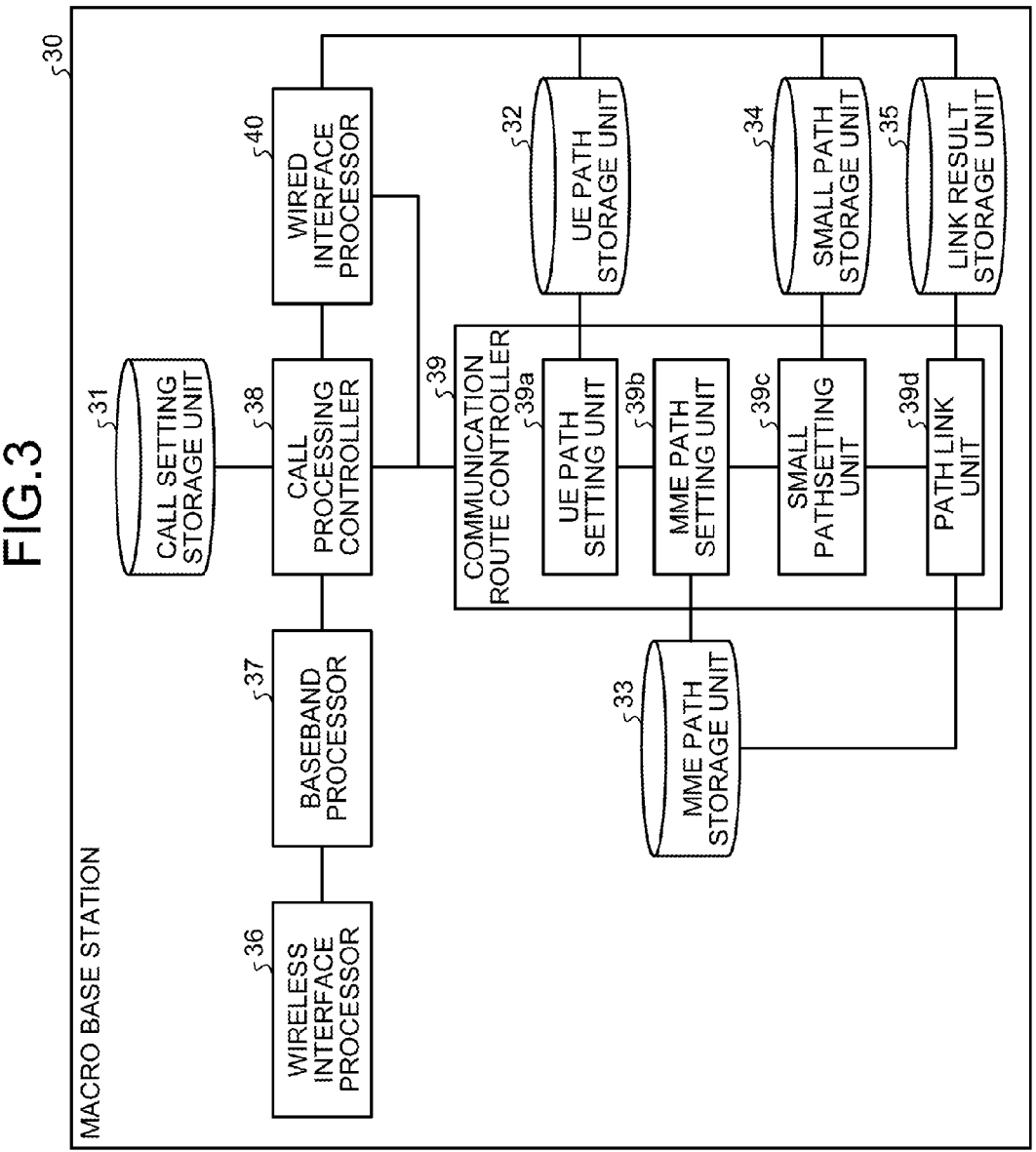
FIG. 3 is a functional block diagram illustrating a functional configuration of a macro base station according to the first embodiment.

FIG. 3 is a functional block diagram illustrating a functional configuration of the macro base station according to the first embodiment. As illustrated in FIG. 3, the macro base station 30 includes a call setting storage unit 31, a UE path storage unit 32, a MME path storage unit 33, a small path storage unit 34, and a link result storage unit 35. Note that each of the storage units is an example of a database and the like provided in a storage device such as a memory and a hard disk.

Furthermore, the macro base station 30 includes a wireless interface processor 36, a baseband processor 37, a call processing controller 38, a communication route controller 39, and a wired interface processor 40. Note that each of the processors is an example of a process performed by a processor and the like or an example of a control circuit.

The call setting storage unit 31 stores call information, for each of the portable terminals 1, used by the portable terminal 1 during the radio communication. For example, the call setting storage unit 31 stores a user identifier such as Cell-Radio Network Temporary Identifier (C-RNTI) as well as information on various resources corresponding to the user identifier such as a baseband resource, a radio bearer resource, and a transmission path resource.

Furthermore, the call setting storage unit 31 stores various baseband-related parameters such as a scheduling type, and radio bearer-related parameters such as a Transmission Power Control (TPC). Furthermore, the call setting storage unit 31 stores an Internet Protocol (IP) address, a port, a transmission path-related parameter such as a Differentiated Services Code Point (DSCP), a security key, and the like. Information stored herein is an example of typical call information used by the portable terminal 1 for using the radio communication and the voice communication.

The UE path storage unit 32 is a storage unit that stores information related to an UE path, which is a communication path between the portable terminal 1 and the macro base station 30, for each of the portable terminals 1. FIG. 4 is a table illustrating exemplary information stored in the UE path storage unit. As illustrated in FIG. 4, the UE path storage unit 32 correlates a UE with the macro base station (IP address and Tunnel Endpoint-Identifier (TE-ID)), and stores it therein.

The UE stored herein is an identifier that identifies the portable terminal 1. The "macro base station (IP address)" is an IP address of the macro base station 30. The "macro base station (TE-ID)" is an identifier that identifies a user data communication path (General packet radio service Tunneling Protocol (GTP) path) determined per connection, and is set to a header of data. FIG. 4 exemplifies that for the portable terminal 1 identified as "UE#1", the portable terminal 1 is connected to the macro base station 30 of "192.168.10.1" by the UE path identified as the TE-ID "11".

The MME path storage unit 33 is a storage unit that stores information related to a MME path, which is a communication path between the MME 2 and the macro base station 30, for each of the portable terminals 1. FIG. 5 is a table illustrating exemplary information stored in the MME path storage unit. As illustrated in FIG. 5, the MME path storage unit 33 correlates the "UE" with the "MME/S-GW (IP address and TE-ID)" and the "macro base station (IP address and TE-ID)". The "UE" and the "macro base station (IP address and TE-ID)" stored herein are similar to those in FIG. 4, whereby a detailed description is omitted.

The "MME/S-GW (IP address)" is an IP address of the MME/S-GW 2. The "MME/S-GW (TE-ID)" is an identifier that identifies the user data communication path (GTP path) determined per connection, and is an identifier given by the MME/S-GW 2. FIG. 5 exemplifies that for the portable terminal 1 identified as "UE#1", the MME/S-GW 2 of "192.168.1.1" is connected to the macro base station 30 of "192.168.10.1" by the MME path. Furthermore, this MME path is identified by the "TE-ID=1" on the MME/S-GW 2 side and by the "TE-ID=11" on the macro base station 30 side.

The small path storage unit 34 is a storage unit that stores information related to a small path, which is a communication path between the small base station 10 and the macro base station 30, for each of the portable terminals 1. FIG. 6 is a table illustrating exemplary information stored in the small path storage unit. As illustrated in FIG. 6, the "UE" is correlated with the "macro base station (IP address and TE-ID)" and the "small base station (IP address and TE-ID)", and is stored therein. The "UE" and the "macro base station (IP address and TE-ID)" stored herein are similar to those in FIG. 4, whereby a detailed description is omitted.

The "small base station (IP address)" is an IP address of the small base station 10 to which the portable terminal 1 is connected. The "small base station (TE-ID)" is an identifier that identifies the user data communication path (GTP path) determined per connection, and an identifier given by the small base station 10. FIG. 6 exemplifies that for the portable terminal 1 identified by "UE#1", the macro base station 30 of "192.168.10.1" is connected to the small base station 10 of "192.168.20.1" by the small path. Furthermore, this small path is identified as the "TE-ID=111" on the macro base station 30 side and as the "TE-ID=221" on the small base station 10 side.

The link result storage unit 35 is a storage unit that stores information linking the MME path, between the MME/S-GW 2 and the macro base station 30, and the small path, between the macro base station 30 and the small base station 10, for each of the portable terminals 1. FIG. 7 is a table illustrating exemplary information stored in the link result storage unit.

As illustrated in FIG. 7, the link result storage unit 35 correlates the "TE-ID-1" with the "TE-ID-2", and stores it therein. The "TE-ID-1" stored herein is an identifier that identifies a communication path between the macro base station 30 and the MME/S-GW 2. The "TE-ID-2" is an identifier that identifies a communication path between the macro base station 30 and the small base station 10. In FIG. 7, a case is described in which the portable terminal 1 identified as "UE#1" is connected by a macro path of the "TE-ID=11" and the small path of the "TE-ID=111".

The wireless interface processor 36 is a processor that performs various processing related to radio communication such as modulation and demodulation. For example, the wireless interface processor 36 performs modulation processing on a signal to be transmitted, which is input from the baseband processor 37, and transmits it from an antenna. Furthermore, the wireless interface processor 36 outputs a reception signal, obtained by executing demodulation processing on a signal received from the antenna, to the baseband processor 37.

The baseband processor 37 is a processor that performs LTE baseband processing on the transmission signal and the reception signal. For example, the baseband processor 37 performs the baseband processing on the transmission signal, and outputs it to the wireless interface processor 36. Furthermore, the baseband processor 37 performs the baseband processing on the reception signal, and outputs it to the call processing controller 38 and the like.

The call processing controller 38 is a processor that performs call processing related to the radio communication and the voice communication by using call information stored in the call setting storage unit 31. In a case where the portable terminal 1 is handed over from the macro base station 30 to the small base station 10, the call processing controller 38 extracts the call information corresponding to the handed over portable terminal 1 from the call setting storage unit 31. Then, the call processing controller 38 transmits the call information that has been read to the small base station 10 to be the handover destination.

Furthermore, the call processing controller 38 extracts the call information from a handover request, which is made when the portable terminal 1 is handed over from the small base station 10 to the macro base station 30.

Then, the call processing controller 38 correlates the extracted call information with the handed over portable terminal 1, and stores it in the call setting storage unit 31.

Furthermore, the call processing controller 38 generates the handover according to a radio condition of the portable terminal 1 connected to the macro base station 30, or the portable terminal 1 performing the radio communication through the macro base station 30. For example, the call processing controller 38 detects deterioration in radio quality caused by moving of the portable terminal 1. Then, the call processing controller 38 detects that the portable terminal 1 has moved out to another cell, and generates the handover.

The communication route controller 39 includes an UE path setting unit 39a, a MME path setting unit 39b, a small path setting unit 39c, and a path link unit 39d. The communication route controller 39 is a processor that performs setting of various paths using these setting units.

The UE path setting unit 39a is a processor that establishes the UE path, which is the communication path between the portable terminal 1 and the macro base station 30. Specifically, in a case where the portable terminal 1 originates a call or where the portable terminal 1 is handed over from the small base station 10 to the macro base station 30, the UE path setting unit 39a establishes the UE path, and stores information related to the established UE path in the UE path storage unit 32.

For example, the UE path setting unit 39a gives the TE-ID, which indicates that it is the UE path corresponding to the portable terminal 1. Subsequently, the UE path setting unit 39a correlates the given TE-ID with the identifier that identifies the portable terminal 1 and the IP address of the macro base station 30, and stores it in the UE path storage unit 32. In this way, the UE path setting unit 39a sets a unique UE path for each of the portable terminals 1.

Note that in a case where the portable terminal 1 is handed over from the macro base station 30 to the small base station 10, it is also possible for the UE path setting unit 39a to release the UE path corresponding to the portable terminal 1. Note that to release also includes to delete information related to the corresponding UE path from the UE path storage unit 32 and to invalidate the corresponding UE path, for example.

The MME path setting unit 39b is a processor that establishes the MME path, which is a communication path between the MME/S-GW 2 and the macro base station 30. Specifically, in a case where the portable terminal 1 originates a call, the MME path setting unit 39b establishes the MME path between the MME/S-GW 2 and the macro base station 30. Then, the MME path setting unit 39b stores information related to the established MME path in the MME path storage unit 33.

For example, the MME path setting unit 39b acquires the TE-ID, which indicates that the MME path corresponding to the portable terminal 1 is uniquely identified on the MME/S-GW 2, from the MME/S-GW 2. Furthermore, the MME path setting unit 39b gives the TE-ID that uniquely identifies the MME path corresponding to the portable terminal 1 on the macro base station 30. Subsequently, the MME path setting unit 39b correlates the IP address and the TE-ID of the MME/S-GW, and the IP address and the TE-ID of the macro base station 30 with the identifier that identifies the portable terminal 1, and stores it in the MME path storage unit 33. In this way, the MME path setting unit 39b sets a unique MME path for each of the portable terminals 1.

Note that it is also possible for the MME path setting unit 39b to release the MME path corresponding to the portable terminal 1, for example, in a case where it detects termination of the voice communication or the radio communication of the portable terminal 1, or in a case where the handover occurs between the macro base stations 30.

The small path setting unit 39c is a processor that establishes the small path, which is a communication path between the small base station 10 and the macro base station 30. Specifically, in a case where the portable terminal 1 is handed over from the macro base station 30 to the small base station 10, the small path setting unit 39c establishes the small path between the small base station 10 to be the handover destination and the macro base station 30. Then, the small path setting unit 39c stores information related to the established small path in the small path storage unit 34.

For example, the small path setting unit 39c obtains the TE-ID, which uniquely identifies the small path corresponding to the portable terminal 1 on the small base station 10, from the small base station 10. Furthermore, the small path setting unit 39c gives the TE-ID that uniquely identifies the small path corresponding to the portable terminal 1 on the macro base station 30. Subsequently, the small path setting unit 39c correlates the IP address and the TE-ID of the small base station 10, and the IP address and the TE-ID of the macro base station 30 with the identifier that identifies the portable terminal 1, and stores it in the small path storage unit 34. In this way, the small path setting unit 39c sets a small path unique for each of the portable terminals 1.

Note that it is also possible for the small path setting unit 39c to release the small path corresponding to the portable terminal 1 and the small base station 10, for example, in a case where the portable terminal 1 is handed over from the small base station 10 to the macro base station 30.

The path link unit 39d is a processor that links the MME path and the small path. Specifically, in a case where the small path is established accompanying the handover of the portable terminal 1 from the macro base station 30 to the small base station 10, the path link unit 39d associates the established small path with the MME path, which has been established for the portable terminal 1. Then, the path link unit 39d stores the associated information in the link result storage unit 35.

For example, the path link unit 39d refers to information on the MME path stored in the MME path storage unit 33 and information on the small path stored in the small path storage unit 34, and specifies an identifier of the portable terminal included in both. Then, the path link unit 39d refers to the MME path storage unit 33, and specifies the "TE-ID of the macro base station" corresponding to the identifier of the specified portable terminal. In the same way, the path link unit 39d refers to the small path storage unit 34 to specify the "TE-ID of the macro base station" associated with the identifier of the specified portable terminal. Subsequently, the path link unit 39d correlates each of the specified "TE-ID of the macro base stations", and stores it in the link result storage unit 35.

For example, the path link unit 39d refers to the MME path storage unit 33 and the small path storage unit 34 to specify the "UE#1" stored in both of the storage units. Subsequently, the path link unit 39d refers to the MME path storage unit 33 to specify the "TE-ID of the macro base station=11", which corresponds to "UE#1". Similarly, the path link unit 39d refers to the small path storage unit 34 to specify the "TE-ID of the macro base station=111", which corresponds to "UE#1". Subsequently, the path link unit 39d correlates the "TE-ID of the macro base station=11" with the "TE-ID of the macro base station=111", and stores it in the link result storage unit 35.

In this way, the macro base station 30 can be connected by a path of the portable terminal 1—the small base station 10—the macro base station 30—the MME/S-GW 2. Note that it is also possible for the path link unit 39d to release a link correlated to the portable terminal 1 in a case where the portable terminal 1 is handed over from the small base station 10 to the macro base station 30.

The wired interface processor 40 is a processor that performs relay control of uplink data transmitted from the portable terminal 1 and downlink data transmitted from the MME/S-GW 2. Specifically, the wired interface processor 40 relays C-Plane data and U-Plane data, which are transmitted and received between the portable terminal 1 and the MME/S-GW 2, through a communication path specified based on each of the path storage units and the link result storage unit 35.

Uplink Data

For example, in a case where the wired interface processor 40 receives data transmitted from the portable terminal 1 to the MME/S-GW 2 through the small base station 10, it extracts the TE-ID "221" from a header and the like of the data. Then, by using the extracted TE-ID "221" as a search key, the wired interface processor 40 searches through the "macro base station" of the small path storage unit 34.

Then, the wired interface processor 40 specifies the TE-ID of the macro base station "111", which is correlated to the corresponding TE-ID "221", from the small path storage unit 34. Subsequently, by using the TE-ID "111" of the specified macro base station as "TE-ID-2", the wired interface processor 40 searches through the link result storage unit 35 and specifies the "TE-ID-1=11", which is correlated to the "TE-ID-2=111".

Then, by using the specified "TE-ID-1=11" as the TE-ID of the macro base station, the wired interface processor 40 searches through the MME path storage unit 33, and specifies the TE-ID of the MME/S-GW 2 "1". Then, by using the MME path corresponding to the TE-ID of the MME/S-GW 2 "1", the wired interface processor 40 forwards data to the MME/S-GW 2.

Furthermore, in a case where the data transmitted from the portable terminal 1 to the MME/S-GW 2 is received directly, the wired interface processor 40 extracts the TE-ID "11" from the header and the like of the data. Subsequently, by using the TE-ID "11" as the search key, the wired interface processor 40 searches through the MME path storage unit 33 and specifies the TE-ID of the MME/S-GW 2 "1", which is correlated to the TE-ID "11". Subsequently, by using the MME path corresponding to the TE-ID of the MME/S-GW "1", the wired interface processor 40 forwards the data to the MME/S-GW 2.

Downlink Data

Furthermore, in a case where the wired interface processor 40 receives the data from the MME/S-GW 2 to the portable terminal 1, it extracts the TE-ID "3" from a header and the like of the data. Then, by using the extracted TE-ID "3" as the search key, the wired interface processor 40 searches through the MME path storage unit 33 and specifies the TE-ID of the macro base station "13".

Then, by using the TE-ID of the macro base station "13" as the "TE-ID-1", the wired interface processor 40 searches through the link result storage unit 35 and specifies the TE-ID-2 "113". Subsequently, the wired interface processor 40 specifies a record, which has the TE-ID-2 "113" as the TE-ID of the macro base station, from the small path storage unit 34, and relays the data through the small path with the corresponding small base station.

On the other hand, in a case where the wired interface processor 40 searches through the link result storage unit 35 by using the TE-ID of the macro base station "13" as the "TE-ID-1" but the corresponding record is not found, by using the TE-ID of the macro base station "13" as the search key, the wired interface processor 40 refers to the UE path storage unit 32 and searches for a corresponding UE path. Then, by using the searched UE path, the wireless interface processor 36 transmits the data to the portable terminal 1.

Configuration of Small Base Station

Figure 8:
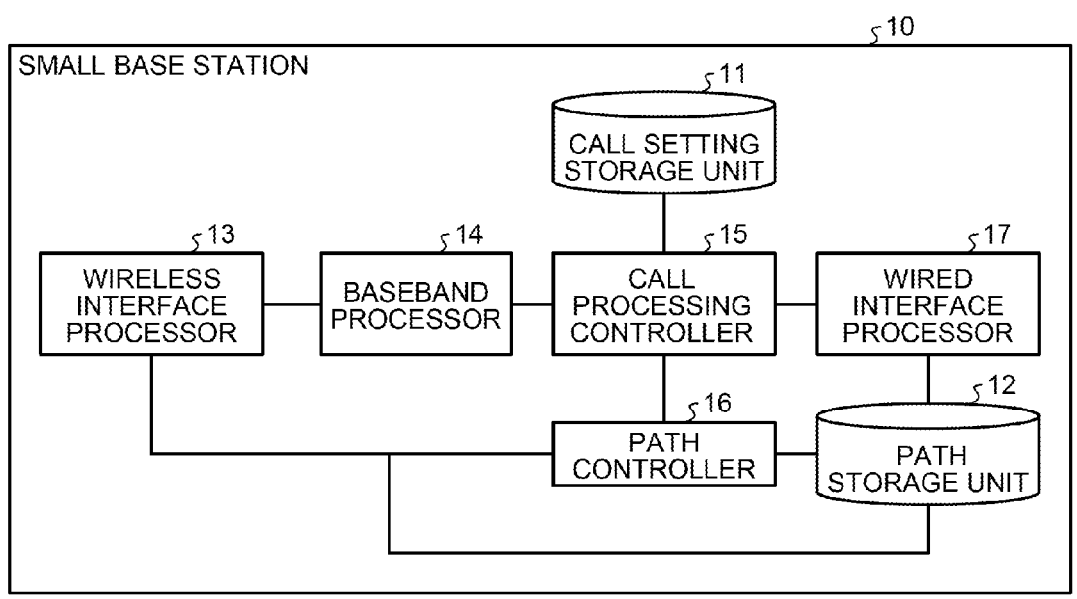
FIG. 8 is a functional block diagram illustrating a functional configuration of a small base station according to the first embodiment.

FIG. 8 is a functional block diagram illustrating a functional configuration of the small base station according to the first embodiment. As illustrated in FIG. 8, the small base station 10 includes a call setting storage unit 11 and a path storage unit 12. Note that each of the storage units is an example of database and the like provided in a storage device such as a memory and a hard disk.

Furthermore, the small base station 10 includes a wireless interface processor 13, a baseband processor 14, a call processing controller 15, a path controller 16, and a wired interface processor 17. Note that each of the processors is an example of a process performed by a processor and the like, or an example of a control circuit.

The call setting storage unit 31, for each of the portable terminal 1, stores the call information used by the portable terminal 1 during the radio communication. The information stored here is similar to the information described in the configuration of the macro base station 30, whereby a detailed description is omitted. Furthermore, the information stored by the call setting storage unit 31 is renewed as appropriate by the call processing controller 15 described below.

The path storage unit 12 is a storage unit that stores information related to a communication path between the portable terminal 1 and the small base station 10. Specifically, the path storage unit 12 stores the TE-ID and the like currently used by the portable terminal 1. For example, the path storage unit 12 stores the TE-ID generated by the path controller 16 described below. Note that the path storage unit 12 can also store information similar to the information related to the small path illustrated in FIG. 6.

The wireless interface processor 13 is a processor that performs various processing related to the radio communication such as modulation and demodulation. For example, the wireless interface processor 13 performs modulation processing on a signal to be transmitted, which is input from the baseband processor 14, and transmits it from an antenna. Furthermore, the wireless interface processor 13 outputs a reception signal, obtained by executing demodulation processing on the signal received from the antenna, to the baseband processor 14.

The baseband processor 14 is a processor that performs LTE baseband processing on the transmission signal and the reception signal. For example, the baseband processor 14 performs the baseband processing on the transmission signal, and outputs it to the wireless interface processor 13. Furthermore, the baseband processor 14 performs the baseband processing on the reception signal, and outputs it to the call processing controller 15 and the like.

The call processing controller 15 is a processor that performs call processing related to the radio communication and the voice communication by using call information stored in the call setting storage unit 31. In a case where the portable terminal 1 is handed over from the macro base station 30 to the small base station 10, the call processing controller 15 stores the call information received from the macro base station 30, or a handover origination, in the call setting storage unit 11.

Furthermore, when the portable terminal 1 is handed over from the small base station 10 to the macro base station 30, the call processing controller 15 transmits the call information to be stored in the call setting storage unit 31 to the macro base station 30. At this time, the call processing controller 15 can also compare the call information at the time of the handover from the macro base station 30 to the small base station 10 with the call information of this handover, and transmit a difference to the macro base station 30.

Furthermore, the call processing controller 15 generates the handover according to a radio condition of the portable terminal 1 connected to the small base station 10, or the portable terminal 1 performing the radio communication through the small base station 10. For example, the call processing controller 15 detects deterioration in radio quality caused by moving of the portable terminal 1. Then, the call processing controller 15 detects that the portable terminal 1 has moved out to another cell, and generates the handover.

The path controller 16 is a processor that generates, for each of the portable terminals 1, the TE-ID that identifies the small path established between the macro base station 30 and the small base station 10, and stores it in the path storage unit 12. Furthermore, in response to a request from the macro base station 30, the path controller 16 transmits the generated TE-ID to the macro base station 30. Note that the path controller 16 can also generate information similar to the information related to the small path illustrated in FIG. 6, and store it in the path storage unit 12.

The wired interface processor 17 is a processor that performs relay control of the uplink data transmitted from the portable terminal 1 and the downlink data transmitted from the MME/S-GW 2. Specifically, the wired interface processor 17 relays the C-Plane data and the U-Plane data, which are transmitted and received between the portable terminal 1 and the MME/S-GW 2, based on the path storage unit 12.

Downlink Data

For example, in a case where the wired interface processor 17 receives data transmitted from the MME/S-GW 2 through the macro base station 30, it extracts the TE-ID from the received data. Subsequently, the wired interface processor 17 refers to the path storage unit 12 to specify a communication path corresponding to the extracted TE-ID. Subsequently, by using the specified communication path, the wireless interface processor 13 transmits the data to the portable terminal 1.

Uplink Data

Furthermore, when the wired interface processor 17 receives the data transmitted from the portable terminal 1, it extracts the TE-ID from the received data. Subsequently, the wired interface processor 17 refers to the path storage unit 12 to specify a communication path corresponding to the extracted TE-ID. Subsequently, by using the specified communication path, the wired interface processor 17 transmits the data to the MME/S-GW 2.

Processing Flow

Figure 9:
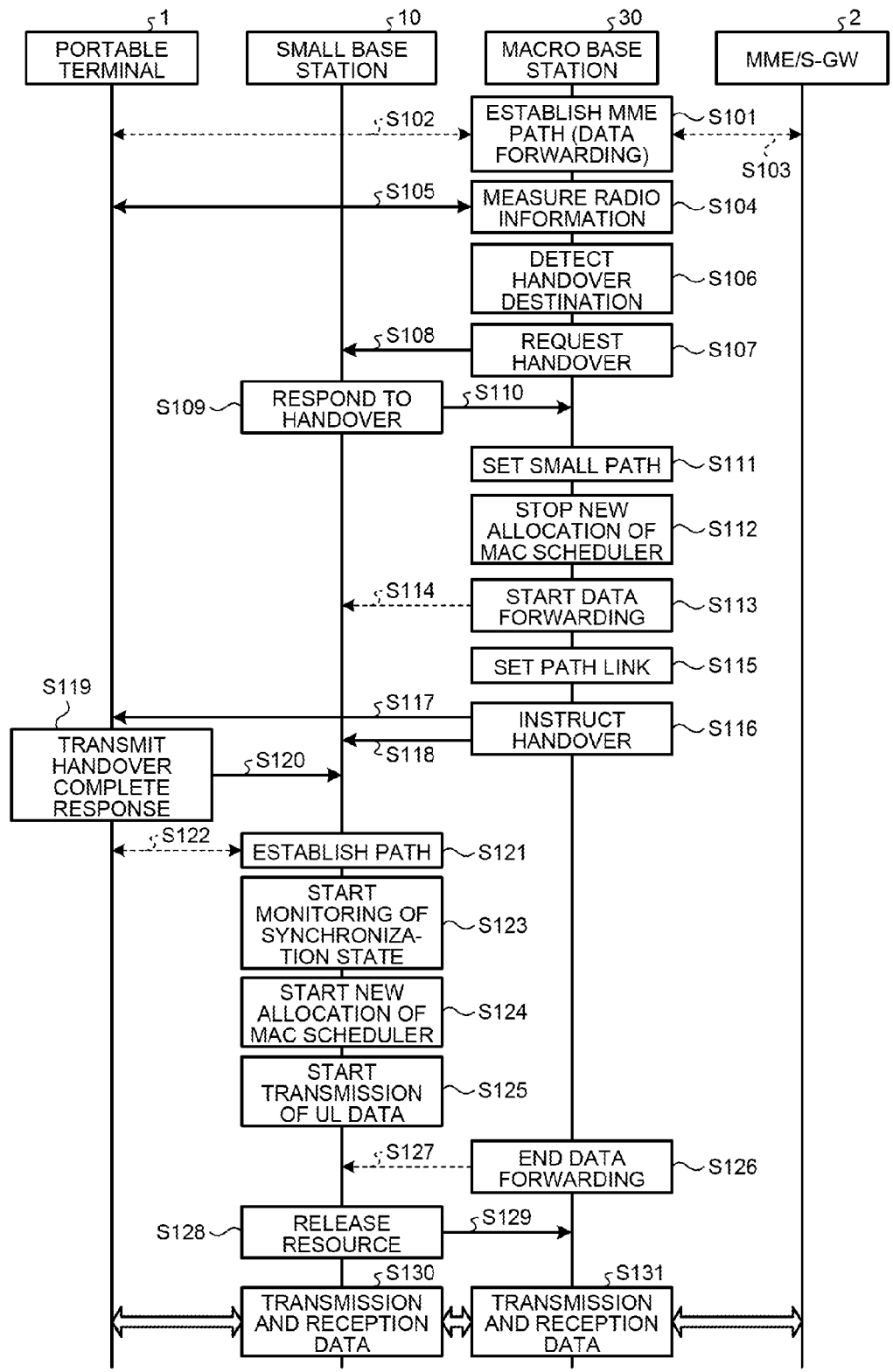
FIG. 9 is a processing sequence diagram illustrating a flow of handover processing according to the first embodiment.

FIG. 9 is a processing sequence diagram illustrating a handover processing flow according to the first embodiment. As illustrated in FIG. 9, the macro base station 30 has already established the MME path (S101), and is in a state of relaying communication between the portable terminal 1 and the MME/S-GW 2 (S102 and S103). Note that the TE-ID of the MME path on the MME side is generated by the MME and the like and is provided to the macro base station 30.

In this state, the call processing controller 38 of the macro base station 30 measures radio information to be used by the portable terminal 1 (S104 and S105), and detects a handover destination when it detects deterioration in the radio condition (S106).

Then, the call processing controller 38 of the macro base station 30 transmits a handover request to the small base station 10 to be the handover destination (S107 and S108). At this time, the call processing controller 38 extracts the call information of the portable terminal 1 to be handed over from the call setting storage unit 31, and transmits it to the small base station 10 to be the handover destination. Furthermore, the call processing controller 38 instructs the small base station 10 to make a setting of the communication path, or the small path, for forwarding the user data being handed over.

Then, the call processing controller 15 of the small base station 10 transmits a handover response to the macro base station 30, or the handover origination (S109 and S110). At this time, the call processing controller 15 stores the call information received from the handover origination in the call setting storage unit 11. Furthermore, with the instruction to create the small path, the call processing controller 15 generates the TE-ID, stores it in the path storage unit 12, and provides it to the macro base station 30.

In this way, the call processing controller 38 of the macro base station 30 makes the setting of the small path (S111). Furthermore, the small path setting unit 39c of the macro base station 30 stores information related to the established small path in the small path storage unit 34.

Subsequently, the call processing controller 38 of the macro base station 30 stops new allocation of a MAC scheduler to the portable terminal 1 to be handed over (S112). For example, the call processing controller 38 stops allocation of the radio resource for the communication with the portable terminal 1 from the open radio resource of a cell under control thereof. Note that a channel number and a data position are included in the radio resource.

Then, the wired interface processor 40 of the macro base station 30 starts data forwarding processing from the macro base station 30, or the handover origination, to the small base station, or the handover destination (S113 and S114). Specifically, the wired interface processor 40 starts the forwarding processing of the user data, being handover processed, from the handover origination to the handover destination.

Then, the path link unit 39d of the macro base station 30 links the MME path that has been established in S103 with the small path established in S111, and stores linked information in the link result storage unit 35 (S115).

Subsequently, the call processing controller 38 of the macro base station 30 or the wired interface processor 40 transmits a handover instruction to the portable terminal 1 and the small base station 10 (S116 to S118). For example, the call processing controller 38 transmits a "RRC Connection Reconfiguration" of a RRC to the portable terminal 1 and transmits a SN STATUS TRANSFER to the small base station 10.

Then, the portable terminal 1 transmits a handover complete response to the small base station 10 (S119 and S120). For example, the portable terminal 1 transmits a "RRC Connection Reconfiguration Complete" of the RRC to the small base station 10.

The path controller 16 of the small base station 10, which has received the handover complete response, establishes a communication path between the portable terminal 1 and the small base station 10 (S121 and S122). Subsequently, the call processing controller 15 of the small base station 10 starts monitoring of a synchronization state (S123), and starts new allocation of the MAC scheduler (S124). Furthermore, the wired interface processor 17 starts transmission of the uplink data (S125).

On the other hand, with completion of the handover, the wired interface processor 40 of the macro base station 30 ends the data forwarding processing started in S113 (S126 and S127).

Subsequently, the wired interface processor 17 of the small base station 10 instructs the macro base station 30 to release the resource (S128 and S129). For example, the macro base station 30 deletes the call information related to the portable terminal 1, the UE path-related information corresponding to the portable terminal 1, and the like. Furthermore, identifier information is made such that it is not allocated to another terminal until the communication of the portable terminal 1 is released and cut.

Then, in this system, data transmission and reception is performed between the portable terminal 1, the small base station 10, the macro base station 30, and the MME/S-GW 2 (S130 and S131). For example, the small base station 10 transmits the uplink data received from the portable terminal 1 by including a TE-ID therein, to the macro base station 30. From the TE-ID of the uplink data, the macro base station 30 specifies the small path that has been used and the MME path linked with the small path, and relays it to the MME/S-GW 2.

Furthermore, the macro base station 30 receives the downlink data from the MME/S-GW 2. The macro base station 30 extracts the TE-ID from the downlink data to specify the MME path that has been used and the small path linked with the MME path, and relays it to the corresponding small base station 10. The small base station 10 transmits the downlink data to the portable terminal 1.

Description of Handover

Figure 10:
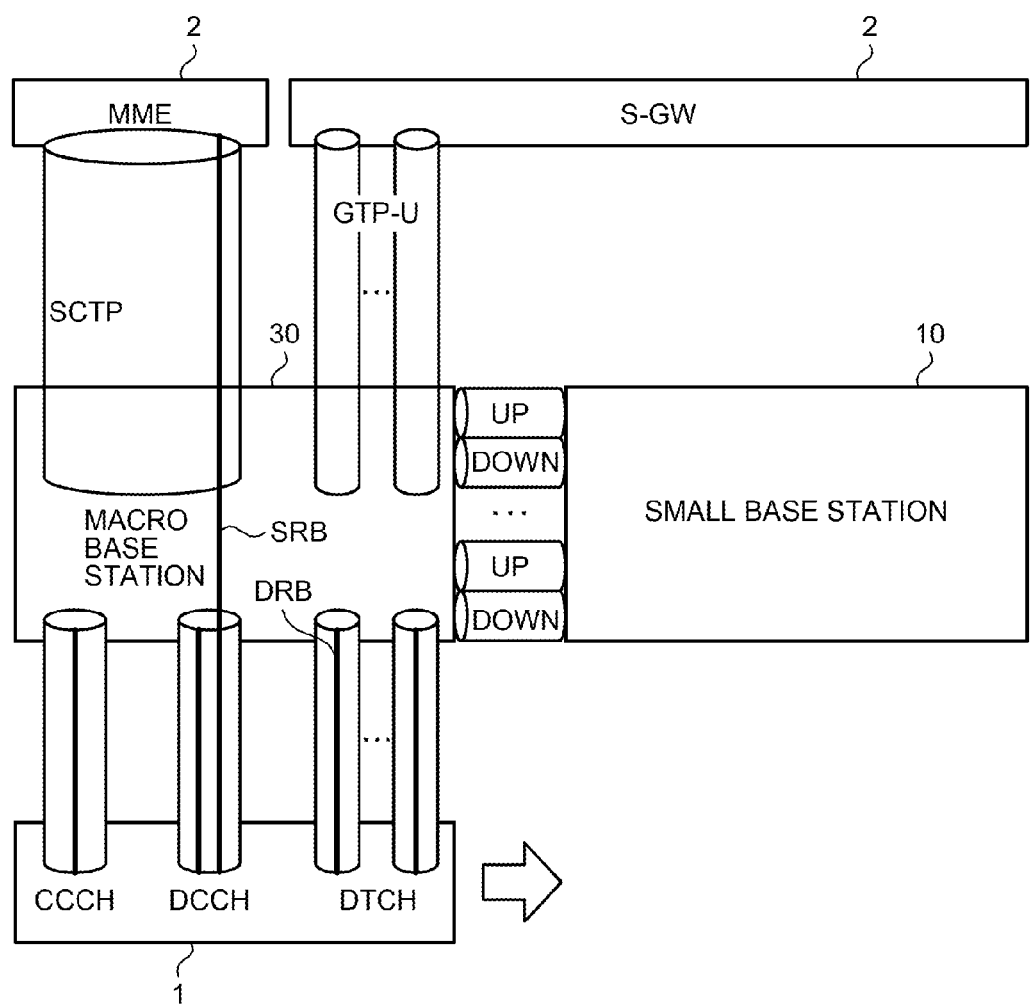
FIG. 10 is a view illustrating pre-handover according to the first embodiment.

FIG. 10 is a view illustrating pre-handover according to the first embodiment. As illustrated in FIG. 10, data communication between the portable terminal 1 and the MME 2 or the S-GW 2 is performed through the macro base station 30 before the handover. Specifically, a Common Control Channel (CCCH), a Dedicated Control Channel (DCCH), and a Dedicated Traffic Channel (DTCH) are established between the portable terminal 1 and the macro base station 30. Furthermore, the macro base station 30 and the MME are connected by a Stream Control Transmission Protocol (SCTP), and the macro base station 30 and the S-GW are connected by the GPRS Tunneling Protocol for User Plane (GTP-U). Note that, for example, the portable terminal 1 and the MME 2 transmit and receive a control message on the Signaling Radio Bearer (SRB), and the portable terminal 1 and the macro base station 30 transmit and receive the user data on the Data Radio Bearer (DRB).

That is, each of the channels connecting the portable terminal 1 with the macro base station 30 corresponds to the UE path described in the first embodiment. Furthermore, a connection between the macro base station 30 and the MME connected by the SCTP as well as a connection between the macro base station 30 and the S-GW connected by the GTP-U correspond to the MME path described in the first embodiment.

Figure 11:
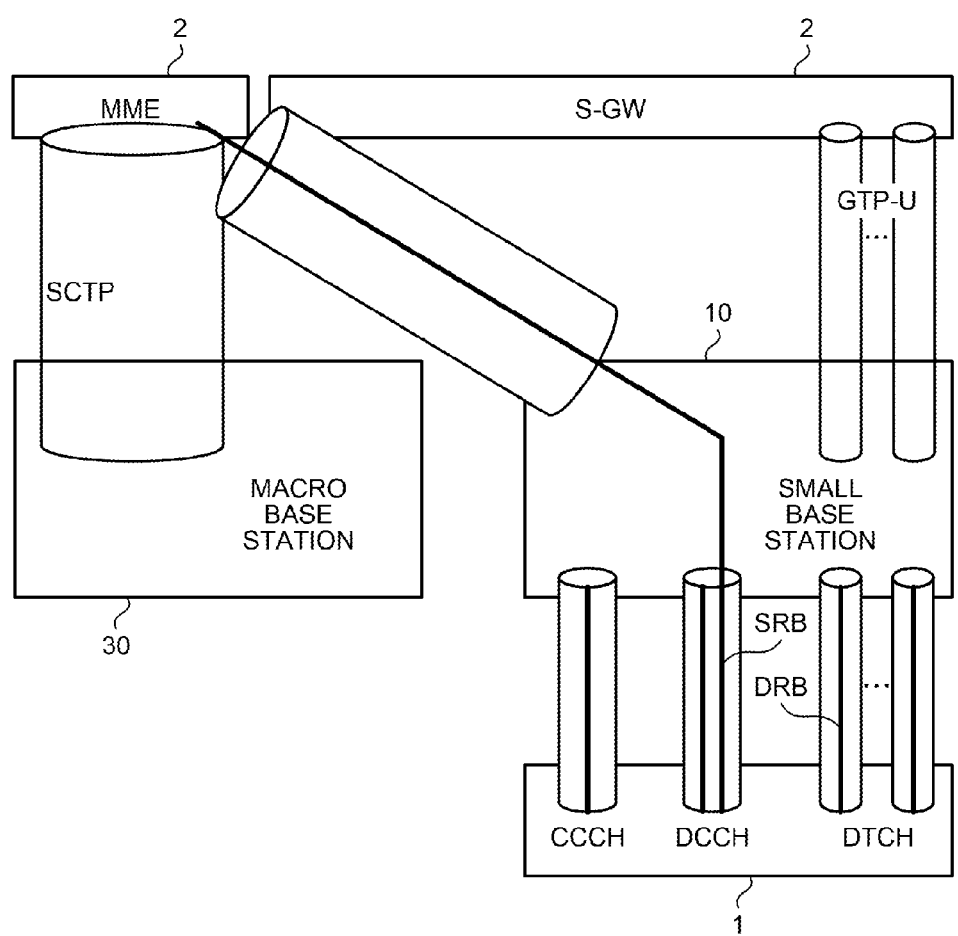
FIG. 11 is a view illustrating typical handover.

In this state, the portable terminal 1 is to be handed over to the small base station 10. FIG. 11 is a view illustrating typical handover. As illustrated in FIG. 11, normally, the base station to be the handover destination is connected to the MME/S-GW 2. That is, the small base station 10 to be the handover destination transmits a request for setting various communication paths for the portable terminal 1 to the MME and the S-GW.

Therefore, a Common Control Channel (CCCH), a Dedicated Control Channel (DCCH), and a Dedicated Traffic Channel (DTCH) are established between the small base station 10 to be the handover destination and the portable terminal 1. Furthermore, the small base station 10 to be the handover destination is connected with the MME by the SCTP, and the small base station 10 to be the handover destination is connected with the S-GW by the GTP-U.

Figure 12:
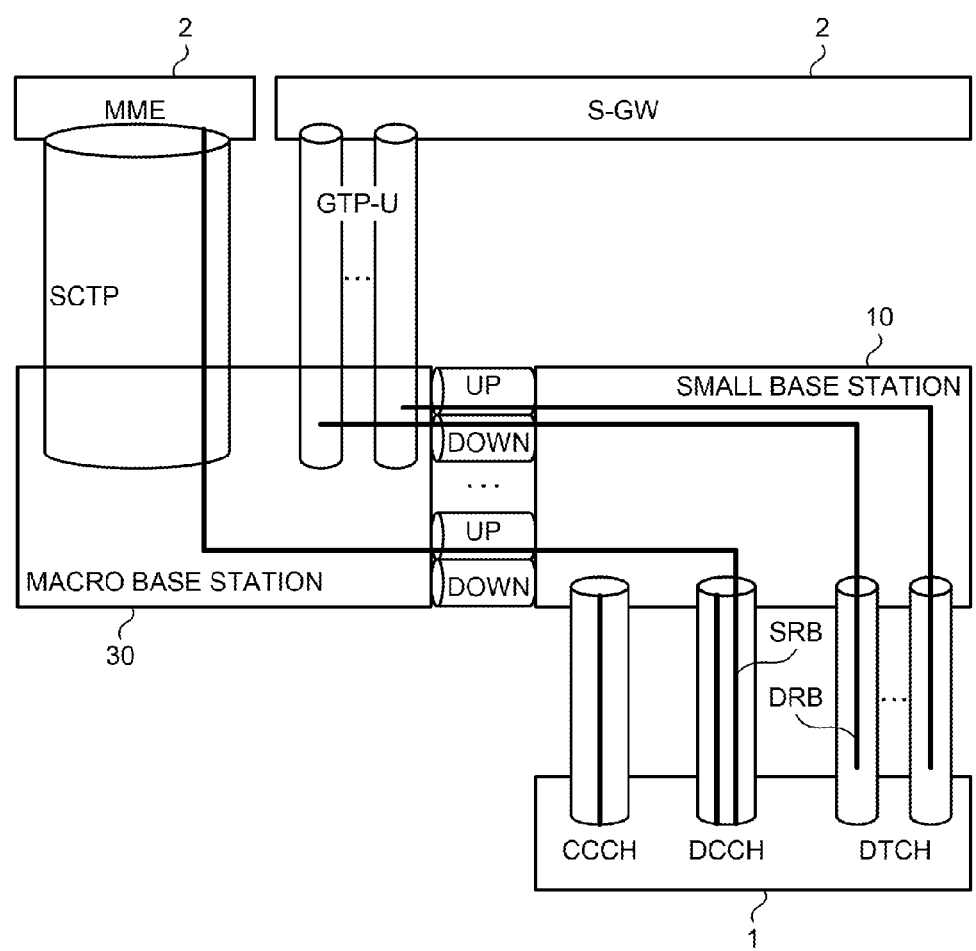
FIG. 12 is a view illustrating post-handover according to the first embodiment.

On the other hand, in the first embodiment, the small base station 10 to be the handover destination does not transmit the request for setting various communication paths for the portable terminal 1 to the MME and the S-GW. FIG. 12 is a view illustrating post-handover according to the first embodiment. As illustrated in FIG. 12, in the first embodiment, a communication path between the macro base station and the MME or the S-GW maintains a state before the handover also after the handover. On the other hand, the Common Control Channel (CCCH), the Dedicated Control Channel (DCCH), and the Dedicated Traffic Channel (DTCH) are established between the small base station 10 to be the handover destination and the portable terminal 1. In addition, a path is also established between the macro base station and the small base station 10 to be the handover destination.

As a result, the uplink data transmitted from the portable terminal 1 reaches the macro base station 30 through the small base station 10 to be the handover destination, and the macro base station 30 relays it by the MME and the like. Furthermore, the downlink data transmitted from the MME and the like reaches the small base station 10, or the handover destination, through the macro base station 30 to be the handover origination, and the small base station 10 relays it to the portable terminal 1.

As described above, in the first embodiment, it is possible to suppress transmission and reception of setting information related to a path for transmission between a higher level device and the small base station 10, or the handover destination in general handover, whereby it is possible to reduce an amount of data of notification.

Specifically, in a case where the handover is performed between base stations under the MME due to moving of the portable terminal 1, the handover can be realized by communication between the base stations and of the portable terminal 1 only without going through the MME/S-GW 2. In this way, the handover processing through the MME can be omitted, or the control signal used in the handover can be suppressed, whereby it is possible to suppress a processing load on a device positioned at a higher level than the base station.

Furthermore, it is possible to increase a communication capacity of the base station per unit area by increasing the number of base stations in the same area. Furthermore, the MME does not recognize the small base station 10, whereby there is an effect of not complicating connection control and state monitoring.

Furthermore, processing congestion caused by an increase in the network load can be decreased, whereby it is possible to avoid or decrease a risk of system stop due to an occurrence of abnormality caused by the processing congestion. Furthermore, signal processing of the MME can be decreased, whereby it is possible to reduce consumed electric power.

Furthermore, the small base station 10 does not perform handover directly between the small base stations 10. Therefore, coverage areas are not always arranged adjacent to each other, and it is possible to decrease mutual radio interference between the small base stations 10.

Furthermore, the path for transmission, which has been set between the handover origination and the handover destination during the handover, is also used as the small path after the handover. According, it is possible to suppress setting of the communication path between the small base station 10 and the MME and the like, whereby it is possible to suppress a waste of network band.

Furthermore, generally, the user identifier for identifying the portable terminal 1 is changed in the small base station 10 to be the handover destination; however, this processing can be suppressed in the first embodiment. Specifically, in the small base station 10, the user identifier, which is notified by the macro base station 30 to be the handover destination, is used as it is and is not changed.

This is because in the first embodiment, the communication connection is established by the macro base station 30 by performing transmission and reception of the control signal related to an incoming and outgoing call operation of the portable terminal 1, whereby the incoming and outgoing call operation is not performed by the small base station 10. Note that the user identifier is given in a case where new communication is generated, or where a new user is generated, within the macro base station 30. Accordingly, in the small base station in which the incoming and outgoing call operation is not performed, the same user identifier as the macro base station 30 can be used without giving the user identifier.

In this way, in the system according to the first embodiment, a plurality of processing generally performed by the handover destination can be omitted. This leads to reducing the processing load, whereby speeding up of the handover can be realized. For example, on the small base station 10 side, it is possible to omit processing of giving the user identifier, processing of releasing a path for data forwarding during the handover after the handover, processing of establishing a path with a higher device, and the like.

[b] Second Embodiment

Next, in a second embodiment, an example is described in which, from a state in the first embodiment, the portable terminal 1 is handed over again to the macro base station 30. Note that the functional configuration is similar to that of the first embodiment, whereby a detailed description is omitted.

Description of Handover

Figure 13:
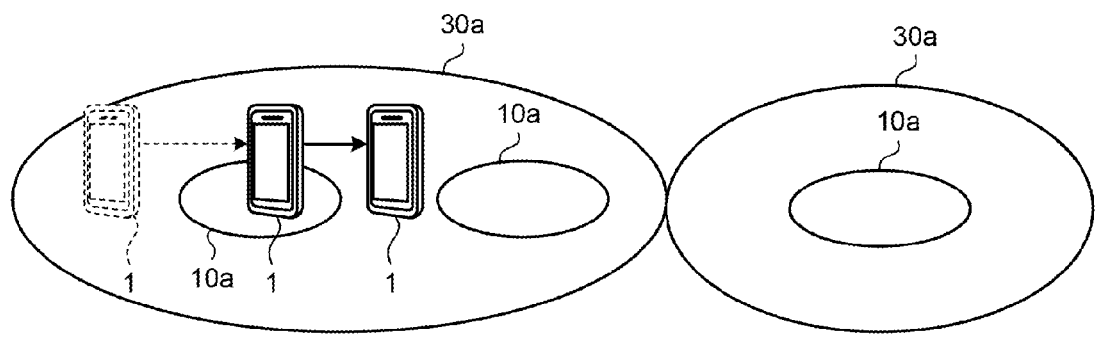
FIG. 13 is a view illustrating handover according to a second embodiment.

FIG. 13 is a view illustrating handover according to the second embodiment. As illustrated in FIG. 13, in the second embodiment, an example is described in which the portable terminal 1 is handed over from a cell 30a controlled by the macro base station 30 to a cell 10a controlled by a small base station 10 by a method according to the first embodiment, and then it moves again into the cell 30a controlled by the macro base station 30. That is, the handover from the small base station 10 to the macro base station 30 is described in the second embodiment.

Processing Flow

Figure 14:
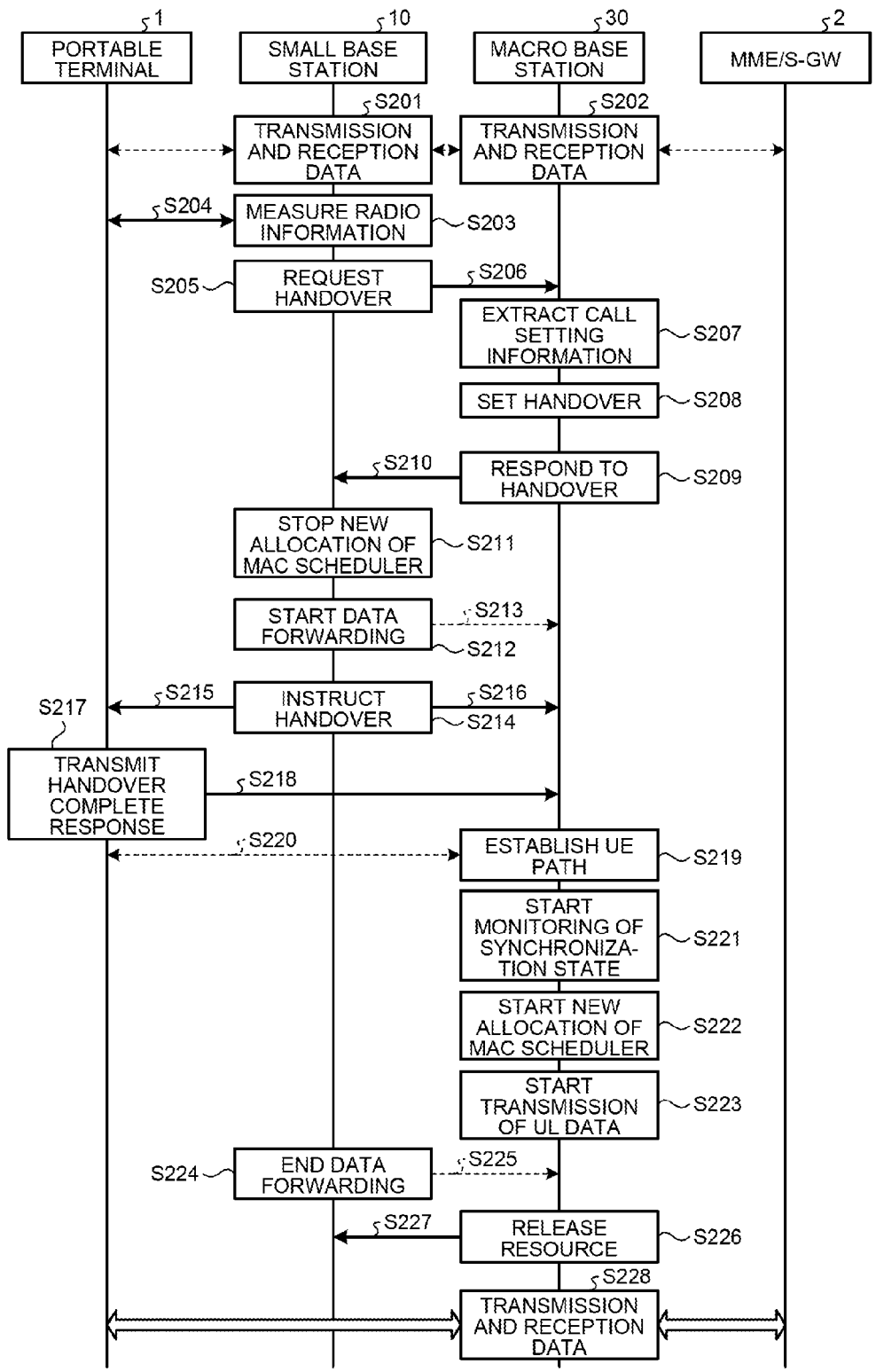
FIG. 14 is a processing sequence diagram illustrating a flow of handover processing according to the second embodiment.

FIG. 14 is a processing sequence diagram illustrating a flow of handover processing according to the second embodiment. As illustrated in FIG. 14, the handover in the first embodiment is already completed in the second embodiment, whereby transmission and reception of data is performed between the portable terminal 1, the small base station 10, the macro base station 30, and a MME/S-GW 2 (S201 and S202).

In this state, a call processing controller 15 of the small base station 10 measures radio information to be used by the portable terminal 1 (S203 and S204), detects a handover destination when it detects deterioration in a radio condition, and transmits a handover request to the macro base station 30 (S205 and S206). At this time, the call processing controller 15 extracts call information of the portable terminal 1 to be handed over from a call setting storage unit 11, and transmits it to the macro base station 30 to be the handover destination. Note that the call information to be transmitted may be only a difference from previous handover.

Then, a call processing controller 38 of the macro base station 30 extracts the call information from the received handover request (S207), and performs a handover setting in which the extracted call information is stored in a call setting storage unit 31 (S208). Subsequently, the call processing controller 38 transmits a handover response to the small base station 10, or a handover origination (S209 and S210).

The call processing controller 15 of the small base station 10, having received the handover response, stops new allocation of a MAC scheduler (S211), and a wired interface processor 17 thereof starts data forwarding processing (S212 and S213). Specifically, the wired interface processor 17 starts processing of forwarding user data, which is being handover processed, from the handover origination to the handover destination.

Then, the call processing controller 15 or the wired interface processor 17 of the small base station 10 transmits a handover instruction to each of the portable terminal 1 and the macro base station 30 (S214 to S216). Subsequently, the portable terminal 1 transmits a handover complete response to the macro base station 30 (S217 and S218).

A UE path setting unit 39a of the macro base station 30, having received the handover complete response, establishes a UE path between the portable terminal 1 and the macro base station 30 (S219 and S220). At this time, the UE path setting unit 39a stores information related to the established UE path in a UE path storage unit 32.

Then, the call processing controller 38 of the macro base station 30 starts monitoring of a synchronization state (S221), and starts new allocation of the MAC scheduler (S222). Furthermore, a wired interface processor 40 starts transmission of uplink data (S223).

On the other hand, with completion of the handover, the wired interface processor 17 of the small base station 10 ends the data forwarding processing started in S212 (S224 and S225).

Subsequently, the wired interface processor 40 of the macro base station 30 instructs the small base station 10 to release a resource (S226 and S227). For example, in the small base station 10, the call information corresponding to the portable terminal 1 is deleted from the call setting storage unit 11, and a communication path connected to the portable terminal 1 is released.

As a result, in this system, transmission and reception of the data is performed between the portable terminal 1, the macro base station 30, and the MME/S-GW 2 (S228). Specifically, the uplink data transmitted from the portable terminal 1 is received by the MME and the like through the macro base station 30. Furthermore, downlink data transmitted from the MME and the like is received by the portable terminal 1 through the macro base station 30.

As described above, in the second embodiment, in the handover from the small base station 10 to the macro base station 30, the communication path used by the portable terminal 1 before the handover can be used as the communication path between the macro base station 30 and the MME and the like. As a result, the macro base station 30 can suppress processing of newly establishing a communication path with the MME and the like, whereby it is possible to decrease a processing load. Furthermore, an amount of data transmitted between the macro base station 30 and the MME and the like can be reduced, whereby it is also possible to decrease a network load.

Furthermore, speeding up of the handover can be realized because the processing load and the network load can be decreased for the entire system. In addition, the small base station 10, or the handover origination, transmits a difference in the call information of the handed over portable terminal 1, whereby the amount of data transmitted from the handover origination to the handover destination can be further reduced.

[c] Third Embodiment

Embodiments of the present invention have been described above; however, the present invention may be carried out also in various different embodiments other than the above-described embodiments. Therefore, a different embodiment is described hereinafter.

Hardware

Figure 15:
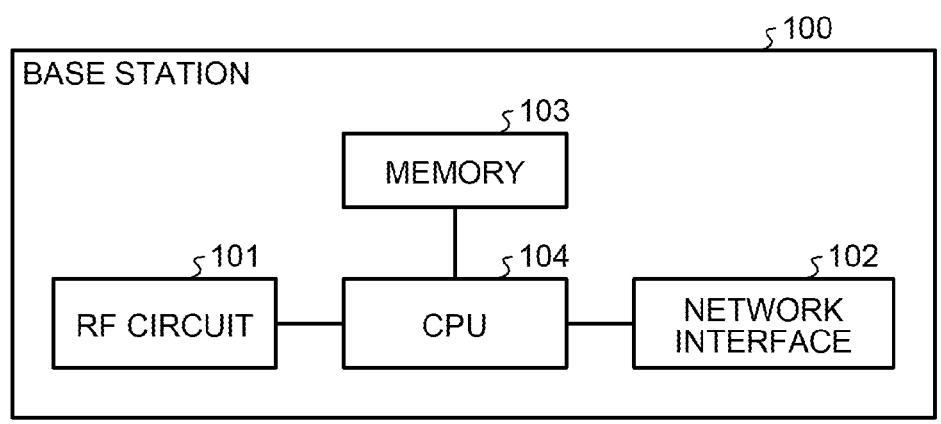
FIG. 15 is a view illustrating exemplary hardware configuration of each base station.

FIG. 15 is a view illustrating an exemplary hardware configuration of each base station. As illustrated in FIG. 15, a base station 100 includes a radio frequency (RF) circuit 101, a network interface 102, a memory 103, and a central processor (CPU) 104.

The RF circuit 101 is a circuit that carries out radio communication, and realizes a wireless interface processor illustrated in FIGS. 3 and 8. The network interface 102 is an interface that performs wired communication, and realizes a wired interface processor illustrated in FIGS. 3 and 8.

The memory 103 is a storage device that stores various data, and stores each of storage units illustrated in FIGS. 3 and 8. The CPU 104 is a processor that controls processing of the entire base station, and realizes each of processors illustrated in FIGS. 3 and 8.

System

Among each of processing described in this Embodiment, all or a part of the processing described as being processed automatically may also be processed manually. Alternatively, all or a part of the processing described as being processed manually may also be processed automatically by a known method. In addition, a processing order, a control order, a specific name, and information including various data and parameters described in the above-described descriptions and in the drawings may be changed arbitrarily unless otherwise specified.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

According to the embodiments, it is possible to suppress an increase in the load on the wireless network caused by the handover.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device comprising:
a processor that executes a process including:
first establishing a first communication path for each mobile terminal with a control device that processes a signal related to network control or a signal related to user data;
second establishing a second communication path with a base station device to be a handover destination when an occurrence of handover of the mobile terminal is detected;
associating the first communication path with the second communication path;
performing relay control of communication between the handed over mobile terminal and the control device based on a relationship between the first communication path and the second communication path that are associated;
transmitting call information to be used by the mobile terminal in radio communication to the base station device to be the handover destination; and
causing the handed over mobile terminal to perform the radio communication through the base station device to be the handover destination.

2. The base station device according to claim 1, wherein the process further comprises:
third establishing a third communication path with the mobile terminal when a handover request is received from the base station device to which the mobile terminal is connected through a communication path,
wherein the performing includes performing relay control of the communication between the handed over mobile terminal and the control device by using the third communication path and the first communication path.

3. The base station device according to claim 2, wherein the process further comprises:
receiving call information, being changed from when the second communication path is established to when the handover request is transmitted, from the base station device when the handover request is received from the base station device having a record of establishing the second communication path; and
performing call control of the handed over mobile terminal using the call information received.

4. The base station device according to claim 2, wherein the second establishing includes releasing the second communication path, established with the base station device that has completed the handover, to the base station device after the third communication path is established.

5. A handover controlling method comprising:
establishing a first communication path for each mobile terminal with a control device that processes a signal related to network control or a signal related to user data;
establishing a second communication path with a base station device to be a handover destination when an occurrence of handover of the mobile terminal is detected;
associating the first communication path with the second communication path;
performing relay control of communication between the handed over mobile terminal and the control device based on a relationship between the first communication path and the second communication path that are associated;
transmitting call information to be used by the mobile terminal in radio communication to the base station device to be the handover destination; and
causing the handed over mobile terminal to perform the radio communication through the base station device to be the handover destination.

6. A radio communication system comprising:
a first base station device; and
a second base station device,
wherein the first base station device includes:
a first processor that executes a first process including:
first establishing a first communication path for each mobile terminal with a control device that processes a signal related to a network control or a signal related to user data;
second establishing a second communication path with the second base station device to be a handover destination when an occurrence of handover of the mobile terminal is detected;
associating the first communication path with the second communication path;
performing relay control of communication between the handed over mobile terminal and the control device based on a relationship between the first communication path and the second communication path that are associated;
transmitting call information to be used by the mobile terminal in radio communication to the second base station device; and
causing the handed over mobile terminal to perform the radio communication through the second base station device,
wherein the second base station device includes:
a second processor that executes a second process including:
third establishing a third communication path with the first base station device, or the handover origination, when the handover occur;
fourth establishing a fourth communication path with the mobile terminal to be performed the handover; and
receiving first communication from the mobile terminal to the control device using the fourth communication path and relaying the first communication to the first base station device using the third communication path, and receiving second communication from the control device to the mobile terminal using the second communication path and relaying the second communication to the mobile terminal using the fourth communication path.

* * * * *